(12) United States Patent
Darshan (10) Patent No.: US 6,650,554 B2
(45) Date of Patent: Nov. 18, 2003

(54) POWER FACTOR CORRECTOR WITH EFFICIENT RIPPLE ATTENUATOR

(75) Inventor: Yair Darshan, Petach (IL)

(73) Assignee: Powersine Ltd., Hod Hasharon (IL)

( * ) Notice: Subject to any disclaimer, the term of this patent is extended or adjusted under 35 U.S.C. 154(b) by 11 days.

(21) Appl. No.: 10/151,406

(22) Filed: May 17, 2002

(65) Prior Publication Data

US 2002/0190696 A1 Dec. 19, 2002

Related U.S. Application Data (60) Provisional application No. 60/292,811, filed on May 22, 2001.

(51) Int. Cl.[7] .............................. G05F 1/70; H02M 1/12
(52) U.S. Cl. ......................................... 363/46; 323/207
(58) Field of Search .............................. 363/44, 45, 46, 363/49, 89; 323/207, 205

(56) References Cited

U.S. PATENT DOCUMENTS

| | | |
|---|---|---|
| 5,355,077 A | 10/1994 | Kates |
| 5,544,064 A | 8/1996 | Beckwith |
| 5,583,421 A | 12/1996 | Barbehenn et al. |
| 5,861,734 A * | 1/1999 | Fasullo et al. .............. 323/222 |
| 5,969,515 A | 10/1999 | Oglesbee |
| 6,268,716 B1 | 7/2001 | Burstein et al. |
| 6,272,027 B1 * | 8/2001 | Fraidlin et al. ............... 363/26 |

OTHER PUBLICATIONS

Ron Lenk, "Application Bulletin AB–20, Optimum Current Sensing Techniques in CPU Converters", Fairchild Semiconductor, 1999. No month.

S. Ben–Yaakov, et al., "The Dynamics of a PWM Boost Converter with Resistive Input", IEEE Trans. on Industrial Electronics, vol. 46, No. 3, Jun. 1999.

S. Ben–Yaakov, et al., << PWM Converters with Resistive Input, IEEE Trans. on Industrial Electronics, vol. 45, No. 3, Jun. 1998.

PowerDsine Application Note 115, entitled: "Power Over LAN™: Building Power Ready Devices", PowerDsine Ltd, Hod Hasharon, Israel, 2002. No month.

Simonetti, et al., "Design Criteria for SEPIC and CUK Converters as PFP in Discontinuous Conduction Mode", IEEE Industrial Electronics Conference (IECON 1992), pp. 283–288. No month.

Carl Blake, et al., "IGBT or MOSFET: Choose Wisely", International Rectifier. 1998. no month.

William Pelletier, et al., "Current Limiting Defuses the DC/DC Time Bomb". EDN (US Ed.), vol. 43, No. 8, Apr. 1998.

Current Limit Technologies for DC/DC Power Solutions, Switch Power, Inc. 2000. no month.

IEEE Draft P802.3af/D3.0, entitled: "Data Terminal Equipment (DTE) Power Via Media Dependent Interface (MDI)", IEEE Standards Department, Piscataway, New Jersey, 2001. no month.

\* cited by examiner

Primary Examiner—Shawn Riley (57) ABSTRACT

Power supply apparatus includes a power factor corrector (PFC) unit, which is adapted to receive an AC voltage from an AC source, and to smooth the AC voltage while adjusting a waveform of an AC input current from the AC source relative to the AC voltage so as to generate a PFC output voltage made up of a DC component with a residual AC ripple. A regulator is coupled to receive an indication of a ripple amplitude and a ripple phase of the residual AC ripple and to generate, responsive thereto, a correction voltage which is combined with the PFC voltage to generate a DC output voltage in which the AC ripple is substantially reduced relative to the PFC voltage.

44 Claims, 4 Drawing Sheets

POWER FACTOR CORRECTOR WITH EFFICIENT RIPPLE ATTENUATOR

CROSS-REFERENCE TO RELATED APPLICATION

This application claims the benefit of U.S. Provisional Patent Application No. 60/292,811, filed May 22, 2001, which is incorporated herein by reference.

FIELD OF THE INVENTION

The present invention relates generally to power supplies, and specifically to efficient switch mode AC/DC power supplies with high power factor and low AC ripple at its output.

BACKGROUND OF THE INVENTION

For efficient operation and low harmonic content, AC/DC switch mode power supplies commonly use an active power factor corrector (PFC) to make the AC input current track the input voltage waveform shape. (When the power factor is one, the voltage and current are exactly in phase, with the same shape, so that the ratio between the voltage and the current is that of a pure resistance.) Typically, active PFC is implemented by switching the AC input current at high frequency, using pulse width modulation (PWM) so that the current waveform approximates the AC voltage waveform as closely as possible. The switch output is smoothed by an L/C filter to give a DC voltage, but there is invariably residual AC ripple at line frequency harmonics. It can be shown that using a single switching stage with a power factor approaching one and a finite output capacitance, it is impossible to eliminate the AC ripple completely.

For this reason, switch mode power supplies with PFC frequently use a two-stage architecture, in which the first stage is designed to achieve a high power factor, while the second stage removes the residual AC ripple. (The dual-stage design is also useful in bringing the output voltage to any desired level and improving the dynamic behavior of the power supply.). The first stage may comprise, for example, a boost-type converter with DC first-stage output set to 400 V and ripple in the range of 5–30 V peak-to-peak. The second stage comprises a DC—DC converter, with its own PWM controller and switch, which receives and down-converts the DC output voltage of the first stage to the desired output supply voltage. The second stage uses a feedback loop from the supply output to the PWM controller in order to attenuate the ripple.

This two-stage topology is costly to implement and suffers from low efficiency. Each independent stage must switch the full voltage and current of the supply. In other words, there is double conversion of the full supply power. Therefore, the total power losses of a two-stage supply are roughly double those of a single-stage switch-mode supply with comparable output power and per-stage efficiency. The total of the major cost components (including magnetic elements, large capacitors, power diodes, heat sink, printed circuit board area, etc.) of the two-stage supply are, likewise, almost double those of the single-stage equivalent.

SUMMARY OF THE INVENTION

It is an object of some aspects of the present invention to provide efficient switch-mode power supplies with high power factor and low ripple.

In preferred embodiments of the present invention, a DC power supply comprises a switch-mode power stage, which converts an AC input voltage to a DC output voltage, together with an output regulator for sensing and removing the ripple from the DC output voltage. Preferably, the power stage is designed and controlled to achieve high power factor, as is known in the art. The regulator receives as its input not the entire DC output voltage, as in two-stage supplies known in the art, but rather only a small fraction of the DC output voltage, equal roughly to the amplitude of the peak-to-peak ripple generated by the power stage. Based on this input, the regulator generates a correction waveform of proper amplitude and phase to cancel the ripple in the DC output voltage.

Preferably, for high efficiency, the regulator comprises a switch, which operates by pulse width modulation (PWM) based on feedback from the power supply output. Although the regulator switches the full current of the power supply, it must typically switch only the small fraction of the output voltage that it receives. It therefore dissipates far less power than the second (ripple attenuating) stage of a two-stage power supply, as described above. As a result, the novel power supply of the present invention is able to achieve high PFC and low ripple, comparable to two-stage supplies known in the art, with far higher efficiency.

An output regulator as described herein may be used in conjunction with substantially any type of power stage known in the art, implementing any suitable method for PFC. Even when high power factor is not a key design objective, output regulators in accordance with the present invention may still be used for efficient ripple cancellation, such as in a power supply having a small output capacitance. Different types of output regulators may be used, as well, including linear regulator designs when very low ripple is desired and efficiency is not the paramount concern. The PWM operation of the regulator can be controlled using standard PWM controllers, digital controllers or fuzzy-logic type controllers.

There is therefore provided, in accordance with a preferred embodiment of the present invention, power supply apparatus, including:

a power factor corrector (PFC) unit, which is adapted to receive an AC voltage from an AC source, and to smooth the AC voltage while adjusting a waveform of an AC input current from the AC source relative to the AC voltage so as to generate an output PFC voltage made up of a DC component with a residual AC ripple while the power factor measured at the unit input is close to one (approaching the theoretical maximum); and a regulator, coupled to receive an indication of a ripple amplitude and a ripple phase of the residual AC ripple and to generate, responsive thereto, a correction voltage which is combined with the PFC voltage to generate a DC output voltage in which the AC ripple is substantially reduced relative to the PFC output ripple voltage.

Preferably, the PFC unit includes a switch, which is coupled so that when the switch is closed, the AC input current flows through the switch, and a control circuit, which is coupled to open and close the switch so as to adjust the waveform of the AC input current. Most preferably, the control circuit is adapted to control the switch so as to apply a pulse-width modulation (PWM) to the AC input current with a duty cycle selected so as to cause a desired adjustment of the input current waveform. Alternatively, the control circuit is adapted to control the switch so as to apply constant-on-time control or constant duty cycle/variable frequency control to the AC input current.

Preferably, the control circuit is coupled to receive a feedback input indicative of the PFC output voltage, and to open and close the switch responsive to the feedback, input. Additionally or alternatively, the control circuit is coupled to receive a control input indicative of at least one of the AC voltage and the AC input current, and to open and close the switch responsive to the control input.

In a preferred embodiment, the PFC unit includes a transformer including primary and secondary windings, which are coupled so that the AC input current flows through the primary winding, while the PFC voltage appears across the secondary winding.

Preferably, the regulator includes a power input circuit, which is coupled to provide a regulator input current, a switch, which is coupled to the power input so that when the switch is closed, the regulator input current flows through the switch, and a control circuit, which is coupled to receive the indication of the ripple amplitude and the ripple phase, and to open and close the switch responsive to the indication in order to generate the correction voltage. Further preferably, the PFC unit includes a first inductor through which the AC input current flows, and the power input circuit includes a second inductor, which is magnetically coupled to the first inductor so as to generate the regulator input current. Most preferably, the power input circuit further includes a rectifier, which is coupled to the second inductor so as to rectify the input current for input thereof to the switch.

Alternatively, the power input circuit is coupled to receive the AC voltage from the AC source in parallel with the PFC unit. Preferably, the regulator includes a transformer including primary and secondary windings, which are coupled so that the regulator input current flows through the primary winding, and the correction voltage appears across the secondary winding.

Preferably, the regulator includes one or more reactive circuit elements, which are coupled together with the switch in a buck-type regulator configuration or, alternatively, in a boost-type regulator configuration. In a preferred embodiment, the regulator is coupled in series with the PFC unit so that the power input circuit receives the PFC voltage, and the control circuit is operative to open and close the switch with a duty cycle selected so that the output voltage exceeds the PFC voltage by a difference voltage that is approximately equal to a peak-to-peak value of the ripple amplitude.

In an alternative embodiment, the regulator includes a linear regulator.

Preferably, the correction voltage has a correction amplitude that is substantially equal to the ripple amplitude and a correction phase that is substantially opposite to the ripple phase, and the correction voltage is added to the PFC voltage in order to generate the output voltage. Most preferably, the PFC unit includes a PFC output capacitor having first and second terminals, and wherein the regulator includes a regulator output capacitor having a third and fourth terminals, wherein the third terminal is connected to the second terminal, and the PFC unit is configured to output the PFC voltage across the PFC output capacitor, while the regulator is configured to output the correction voltage across the regulator output capacitor, so that the DC output voltage is provided between the first and the fourth terminals.

Preferably, the correction voltage includes one of a positive voltage and a negative voltage or, alternatively, both a positive and a negative voltage.

In a preferred embodiment, the regulator is further adapted to process the DC output voltage so as to generate an AC correction input to the PFC unit.

There is also provided, in accordance with a preferred embodiment of the present invention, a method for supplying DC power, including:

smoothing an AC voltage received from an AC source while performing power factor correction on a waveform of an AC input current from the AC source relative to the AC voltage, so as to generate a PFC voltage made up of a DC component with a residual AC ripple;

receiving an indication of a ripple amplitude and a ripple phase of the residual AC ripple;

generating, responsive to the indication, a correction voltage; and combining the correction voltage with the PFC voltage to generate a DC output voltage in which the AC ripple is substantially reduced relative to the PFC voltage.

The present invention will be more fully understood from the following detailed description of the preferred embodiments thereof, taken together with the drawings in which:

DETAILED DESCRIPTION OF PREFERRED EMBODIMENTS

Figure 1:
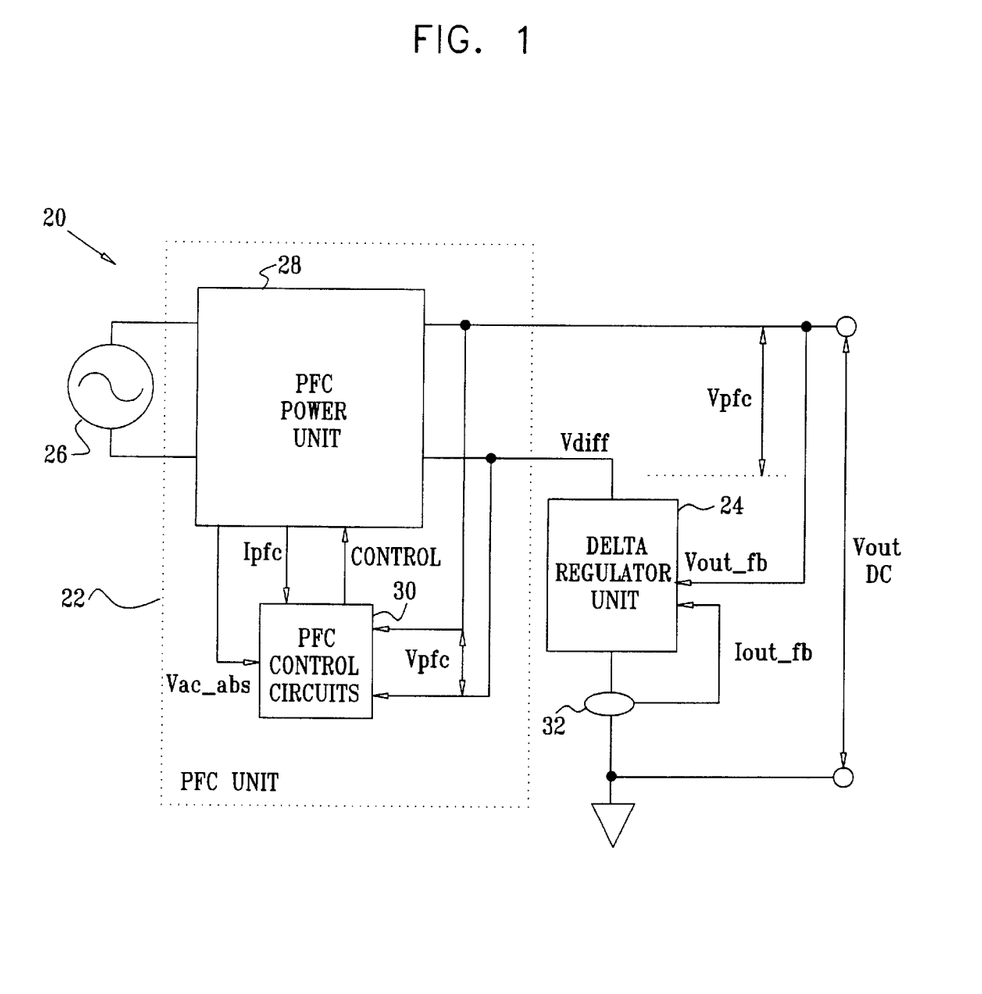
FIG. 1 is a block diagram that schematically illustrates a DC power supply, in accordance with a preferred embodiment of the present invention.

FIG. 1 is a block diagram that schematically illustrates a power supply 20, in accordance with a preferred embodiment of the present invention. FIG. 1 presents a general, conceptual view of a power supply architecture capable of providing a DC output voltage, $V_{out}$, with low ripple, while achieving high power factor correction (PFC) and high efficiency. Exemplary implementations of this architecture are shown in the figures that follow.

Power supply 20 comprises a power stage 22 and an output regulator 24. The power stage comprises a PFC power unit 28, which receives an AC input 26, typically a full-wave rectified input, and outputs a voltage $V_{PFC}$. The PFC power unit typically comprises a PWM-based switching circuit, which is controlled by PFC control circuits 30 to generate its output voltage with a power factor as close as possible to unity. Control circuits 30, which may be implemented using analog and/or digital devices, typically receive as their inputs the rectified AC input voltage $V_{ac\_abs}$, as well as the output voltage $V_{PFC}$ of unit 28 and the input current $I_{PFC}$. Any single one or combination of these parameters can by used by the PFC control circuits, depending on the control algorithm that is used. Based on these inputs (or some subset of the inputs), the control circuits generate a PWM output, which is used to drive the switching circuit in power unit 28. Control circuits 30 can be implemented using commercially-available controller chips, such as the Unitrode UC3854, UCC3817, UCC3858, UCC38500, UC3852 or UC3855 devices, produced by Texas Instruments (Dallas, Tex.), or equivalents. General-purpose PWM controllers for DC/DC converters, such as the UC3842/3 family, UCC3808 or UC3825, may be used for output regulator 24. (Details of operation can be found in the manufacturer's datasheet and application notes.)

The voltage $V_{PFC}$ that is output by power unit 28 includes the DC component $V_{out}$ together with an AC ripple. The ripple component amplitude is input to an output regulator 24, also referred to here as a "delta regulator," since it operates only on the voltage difference between $V_{PFC}$ and $V_{out}$. Regulator 24 senses the output voltage $V_{out}$ and, optionally, senses the output current, $I_{out}$, as well, using a current sensor 32. The regulator may also receive other inputs from PFC power stage 22, either isolated or non-isolated. Regulator 24 generates a differential anti-ripple voltage $V_{diff}$, which is approximately equal in amplitude to the AC ripple in $V_{PFC}$ but opposite in phase thereto. Addition of $V_{diff}$ and $V_{PFC}$ at the output of power supply 20 effectively cancels the AC ripple in $V_{out}$. Note that while $V_{out}$ is used as the input voltage to regulator 24, $V_{PFC}$ (and not $V_{out}$) is preferably used as the feedback input to PFC control circuits 30. In this way, the transfer function of PFC power stage 22 is substantially independent of regulator 24, so that the operation of the regulator does not impair the power factor of the PFC unit.

In the preferred embodiments described below, regulator 24 is implemented as a switching regulator, using PWM to generate the desired anti-ripple voltage. With $V_{out}$=48 VDC, the peak-to-peak ripple component of $V_{PFC}$ is typically about 4 V. Under these conditions, regulator 24 is capable of reducing the ripple in $V_{out}$ to less than 250 mV peak-to-peak. The power consumption of regulator 24 is only about 5% of the power consumption of PFC power stage 22, comparable to the ratio of the RMS output voltages $V_{PFC}$:$V_{diff}$. Therefore, the efficiency of supply 20 is only slightly smaller than the efficiency of PFC power stage 22 alone.

PWM-based switching circuits provide efficient implementation of both PFC power stage 22 and regulator 24. Other methods of PFC and ripple reduction may also be used, however, in the configuration shown in FIG. 1. For example, either or both of the PFC power stage and regulator may operate in continuous current conduction mode (CCM) or discontinuous current conduction mode (DCM). The power stage and/or regulator may also use control algorithms other than PWM, for example, constant-on-time control or constant duty cycle/variable frequency control. The commercially-available controllers mentioned above may be used in this context, as well. Furthermore, regulator 24 may be implemented as a linear regulator, rather than a switching regulator. In this case, peak-to-peak ripple in $V_{out}$ (for $V_{out}$=48 VDC, as in the example cited above) can be reduced to less than 5 mV, but at the expense of reduced efficiency.

Figure 2:
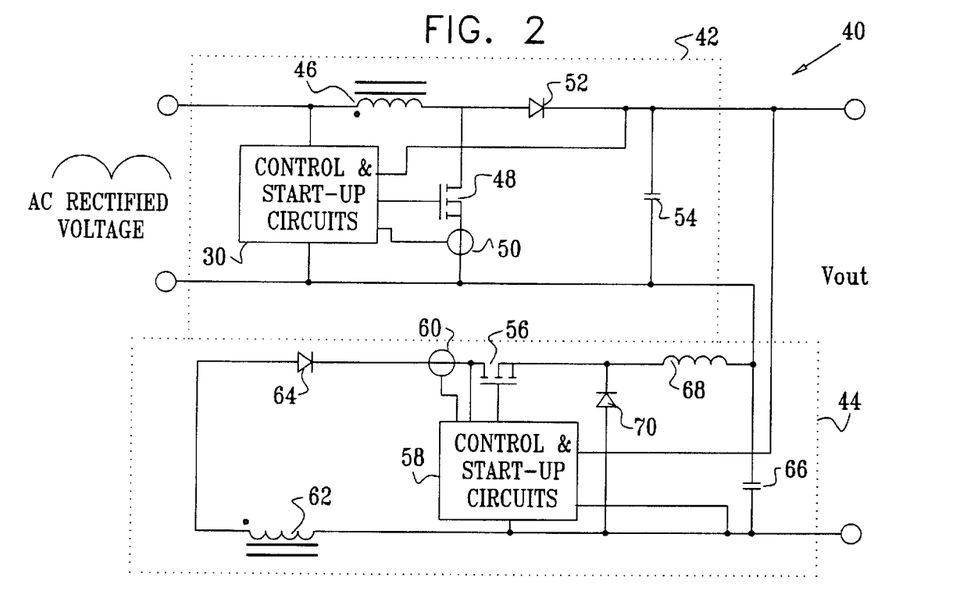
FIGS. 2–7 are schematic electrical diagrams that illustrate DC power supplies, in accordance with preferred embodiments of the present invention.

FIG. 2 is an electrical schematic diagram showing a power supply 40 implementing the principles described above, in accordance with a preferred embodiment of the present invention. Power supply 40 comprises a PFC power stage 42 and a regulator 44, which together generate a DC output voltage $V_{out}$ with high power factor and low ripple. PFC power stage 42 comprises a switch-mode supply based on the well-known "boost" topology.

AC rectified voltage is fed to a boost inductor 46 and flows through a switch 48 when the switch is closed, and through a diode 52 otherwise. Inductor 46 typically has a value between 100 μH and 2 mH, depending on the output power of supply 40 and the operational mode of power stage 42—CCM or DCM. (In CCM operation, the current through the inductor is greater than zero for the entire switching cycle, whereas in DCM, the current through the inductor drops to zero before a new switching cycle starts.) Diode 52 is preferably chosen to have a forward current rating equal at least to the total output current plus a reasonable margin for reliability. In order to reduce switching losses, the diode preferably has a fast recovery time, typically around 50 ns or less for a switching frequency of 100 kHz. The reverse voltage of the diode is preferably above 400 V, typically 500–600 V for 265 Vrms line voltage. Switch 48 typically comprises a field effect transistor (FET), although other switch types may similarly be used. A variety of MOSFETs may be used for this purpose, depending on the output power of supply 40, input voltage, switching frequency and other factors. For example, a STW20NB50 device (produced by STMicroelectronics, may be used for 300–400 W applications, while an IRF840 device (International Rectifier) may be used for lower power, in the 100–200 W range. The output of stage 42 is smoothed by a capacitor 54. Typically capacitor 54 has a value of about 1 μF per watt of output power, with the actual value to be chosen depending on bandwidth, output ripple, cost constraints, dynamic behavior and other factors. In any case, all component values and part numbers are given here solely by way of example, and alternative choices of components will be apparent to those skilled in the art.

Control and start-up circuits 30 sense the input and output voltages of PFC power stage 42 (the output voltage being $V_{PFC}$, as noted above), as well as the input current flow through switch 48 using a current sensor 50. The current sensor typically comprises a sense resistor, providing a sense voltage input to circuits 30. Alternatively, other types of current sensors may be used, as are known in the art. The control circuits apply PWM with variable duty cycle to the gate of switch 48 at a high frequency, typically at least 50–100 kHz, or higher. The PWM signal is calculated so that the AC input current drawn through inductor 46 is in phase with the AC voltage. Exemplary methods for determining the instantaneous duty cycle of the PWM signal to be applied to switch 48 are described by Ben-Yaakov et al., in an article entitled "The Dynamics of a PWM Boost Converter with Resistive Input," *IEEE Transactions on Industrial Electronics* 46:3 (1999), pages 613–619, and in another article entitled "PWM Converters with Resistive Input," *IEEE Transactions on Industrial Electronics* 45:3 (1998), pages 519–520. Both of these articles are incorporated herein by reference.

Regulator 44 comprises a buck-type switching regulator, with its own switch 56, typically a FET or other transistor. Switch 56 is driven by a PWM signal generated by control and start-up circuits 58 of regulator 44, based on feedback from the voltage output $V_{out}$ of power supply 40 and the current measured by a current sensor 60. Control circuits 58 may be implemented using a general-purpose PWM controller, such as those listed above. An auxiliary winding 62 (i.e., an inductor) serves as a power input circuit to regulator 44. For 150 W output, winding 62 typically has a value between 200 and 1000 μH. The winding is inductively coupled to receive power from boost inductor 46. A diode 64 rectifies the current flowing from winding 62 through switch 56. The buck regulator circuit is completed by reactive elements, including a capacitor 66 and an inductor 68, together with a diode 70. Diodes 64 and 70 are preferably fast-recovery diodes, as described above, with parameters chosen as a function of output power, input and output voltage of regulator 44, switching frequency and other factors. Inductor 68 typically has a value between 20 and 300 μH, depending on output power, operating frequency, and the value of output capacitor 66.

Control circuits 58 drive switch 56 so as to create a voltage waveform $V_{diff}$ across capacitor 66 that is equal in magnitude to the AC ripple in the voltage $V_{PFC}$ on capacitor 54 but opposite in phase thereto. Capacitors 54 and 66, arranged in series, serve as the output circuit of power supply 40. The ripple in the total output voltage $V_{out}$ appearing on the output circuit is thus substantially canceled. The coupling polarity between regulator 44 and power stage 42 may also be reversed if appropriate, depending on the requirements of the application and parameter optimization. Regulator 24 may thus be configured to deliver either a positive or a negative voltage to $V_{out}$, or, alternatively, to deliver both positive and negative voltages. Additionally or alternatively, the regulator may be configured to deliver power not only from its input (winding 62) to its output (capacitor 66), but also from its output to its input. In this case, the regulator functions as a DC/AC converter, and may thus provide improved AC signal cancellation. Similar polarity variations may be applied to the other embodiments described here, as well.

Figure 3:
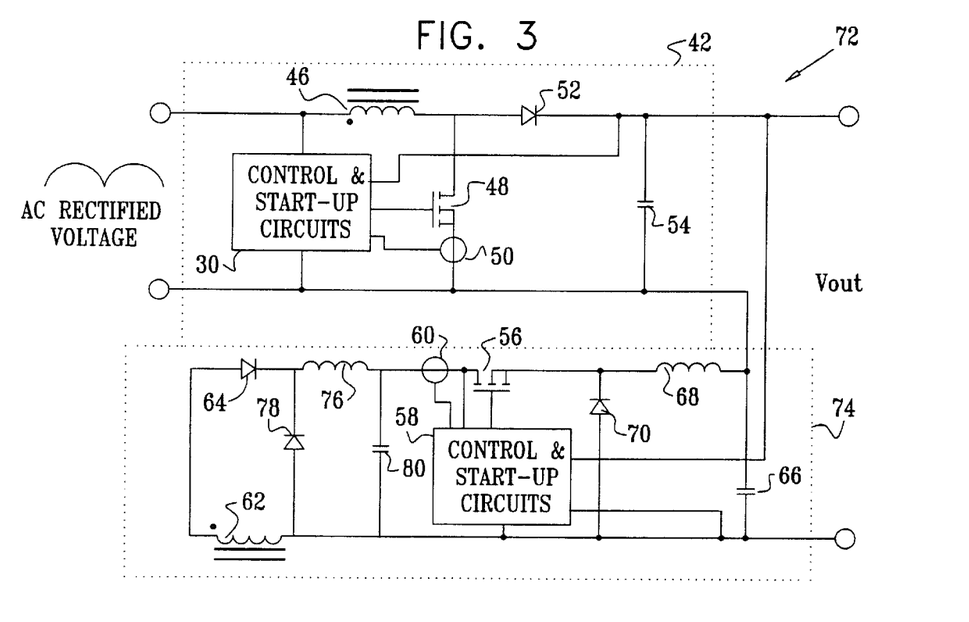

FIG. 3 is an electrical schematic diagram showing a power supply 72, in accordance with another preferred embodiment of the present invention. This power supply is in most respects similar to power supply 40 shown in FIG. 2, and only the points of difference will be described here. Power supply 72 comprises a buck-type regulator 74, which is similar to regulator 44 except for the addition of an inductor 76, a diode 78 and a capacitor 80 in the power input circuit, in conjunction with secondary winding 62. The purpose of these elements is to provide a substantially constant, positive DC voltage to switch 56, by full-wave rectification and smoothing of the AC voltage provided by winding 62. This arrangement improves the efficiency of regulator 74, as well as simplifying the control algorithm to be applied by circuits 58. Component types and values similar to those listed above may be used in this embodiment and in other embodiments described below, as well. As in the preceding embodiment, the coupling polarity between regulator 74 and power stage 42 may also be reversed.

Figure 4:
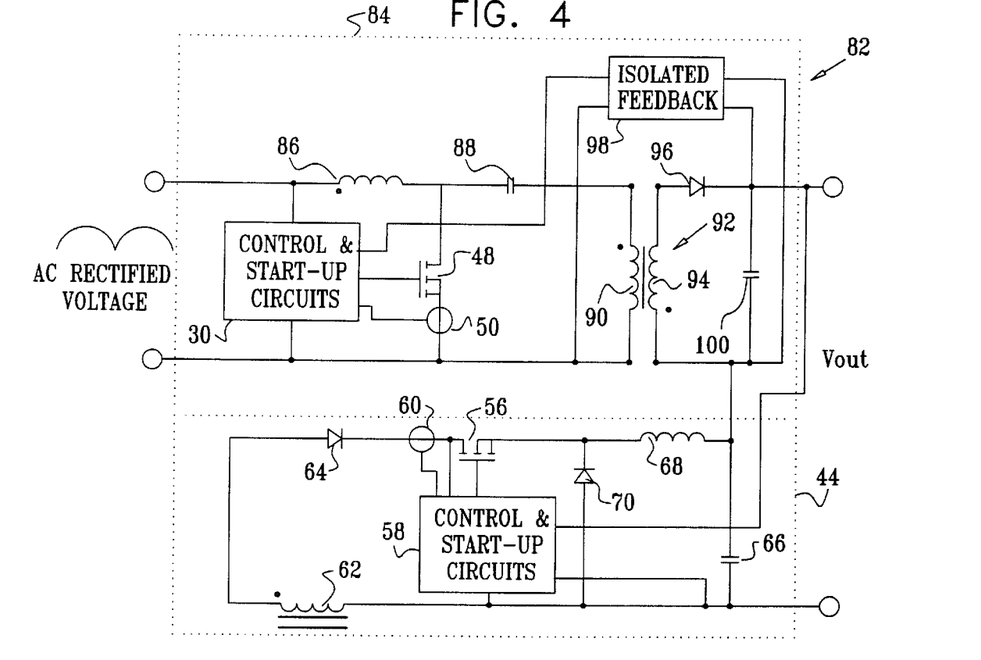

FIG. 4 is an electrical schematic diagram showing a power supply 82, in accordance with yet another preferred embodiment of the present invention. In this case, the power supply comprises a SEPIC-type PFC unit 84, operating in conjunction with Buck regulator 44. The SEPIC topology is advantageous in that its output is isolated from its input by a transformer 92, which also allows the DC output voltage to be set lower than the AC input voltage. SEPIC power supplies are described, for example, in U.S. Pat. No. 5,583,421 and in an article by Simonetti et al., entitled "Design Criteria for SEPIC and CUK Converters as PFP in Discontinuous Conduction Mode," IEEE Industrial Electronics Conference (IECON 1992), pages 283–288. Both of these documents are incorporated herein by reference.

The rectified AC input voltage to PFC unit 84 flows through an inductor 86 and a series capacitor 88 to a primary winding 90 of transformer 92. The current in a secondary winding 94 of the transformer is rectified by a diode 96 and smoothed by an output capacitor 100. An isolated feedback circuit 98 provides a $V_{PFC}$ input to control circuits 30. Typically, feedback circuit 98 comprises an opto-coupler or frequency-to-voltage converter with a small-signal transformer for isolation between the output and the input, as is known in the art. As in the preceding embodiments, regulator 44 creates a ripple cancellation voltage $V_{diff}$ on capacitor 66 that cancels the ripple on capacitor 100. In this case, winding 62 is coupled to receive power from transformer 92. Of course, regulator 74, as shown in FIG. 3, could be used here in place of regulator 44.

Figure 5:
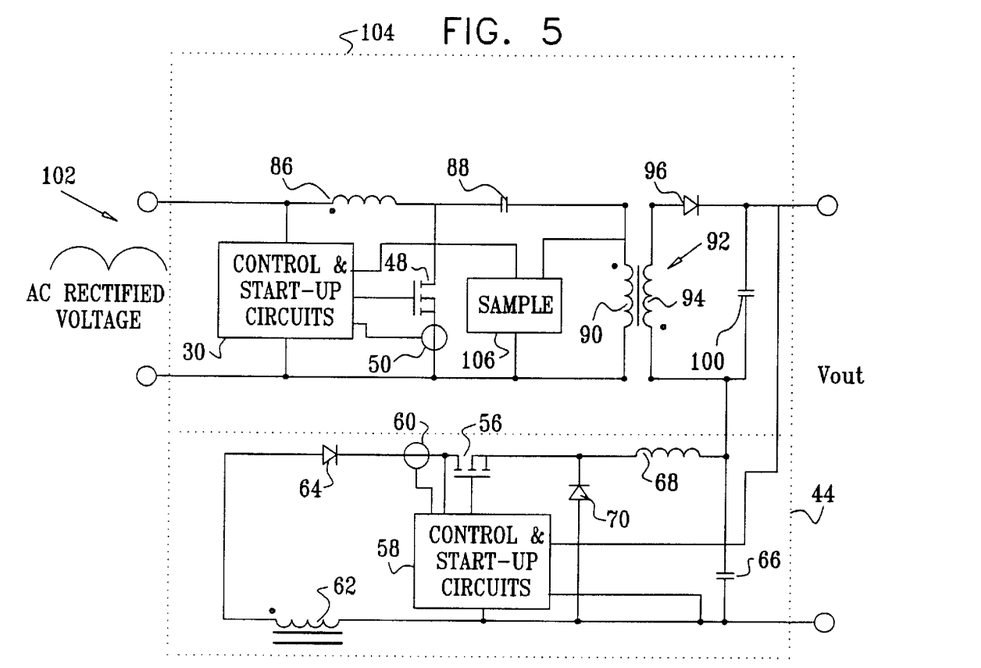

FIG. 5 is an electrical schematic diagram showing a power supply 102, in accordance with still another preferred embodiment of the present invention. In this embodiment, too, a SEPIC PFC unit 104 is used. In the present case, however, control circuits 30 receive their feedback from a sampling circuit 106 on primary winding 90 of transformer 92. Typically, circuit 106 comprises a network made up of a diode and R/C filter, as is known in the art. The sampled voltage reflects $V_{PFC}$ on capacitor 100 during the conduction time of diode 86. This configuration eliminates the need for an isolated feedback circuit from the secondary winding of the transformer. As above, regulator 74 could be used here in place of regulator 44.

Figure 6:
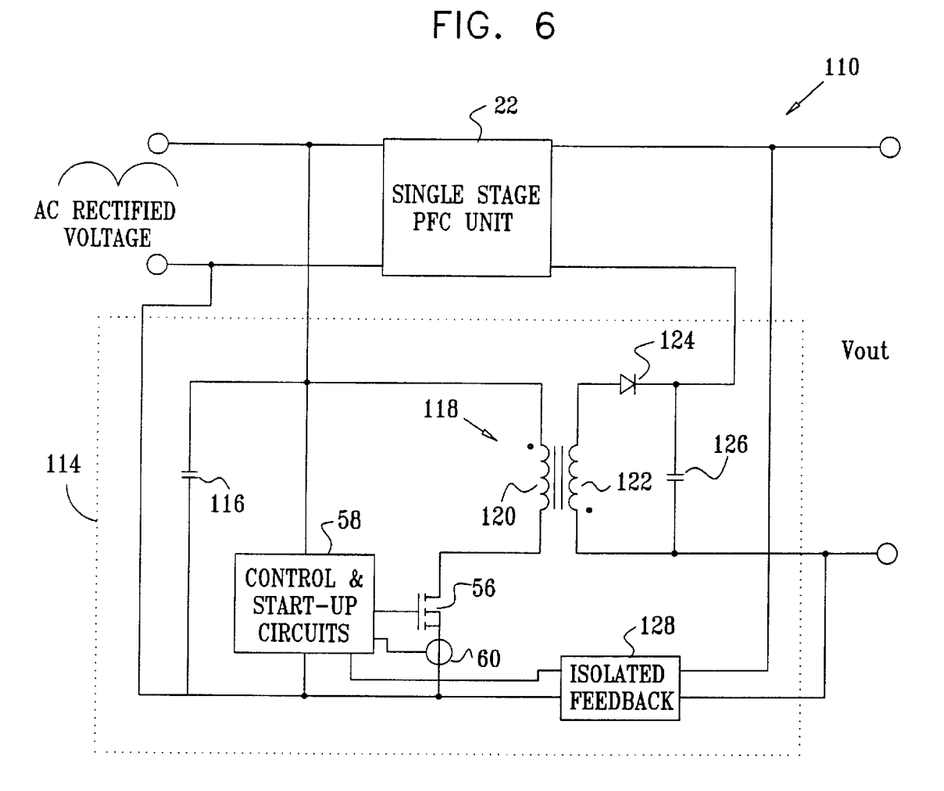

FIG. 6 is an electrical schematic diagram showing a power supply 110, in accordance with a further preferred embodiment of the present invention. Here the power input circuit of a regulator 114 is connected to receive power directly from the AC input to PFC power stage 22 (which may be of any of the types described above). Due to the AC power drawn by regulator 114, the power factor that will be achieved by PFC power stage 22 may be lower than that in the preceding embodiments. On the other hand, the control loop bandwidth of regulator 114 is higher than that of the regulators in those embodiments, so that better ripple cancellation may be achieved in this case.

Control circuits 58 apply a PWM signal to switch 56, in order to switch the AC voltage that is received on a capacitor 116. The switched regulator voltage flows through a primary coil 120 of a transformer 118, which is used to down-convert the voltage and isolate the output of the regulator from its input. The output from a secondary coil 122 of the transformer is rectified by a diode 124, giving rise to the desired anti-ripple voltage waveform on a capacitor 126. An isolated feedback circuit 128 samples the output voltage $V_{out}$ of power supply 110 and provides the sampled level as feedback to control circuits 58. Alternatively, the need for isolation in the feedback loop can be eliminated if, instead, samples from primary coil 118 are subtracted from samples taken from the primary coil in PFC unit 22 (such as primary coil 90 shown in FIGS. 4 and 5) in order to generate input samples to control circuits 58 that reflect $V_{out}$. The representative component values listed above apply to power supply 110, as well as to the other embodiments described here. The power factor of supply 110 and the level of the ripple in the output voltage may be optimized by properly selecting the values of capacitor 116 and of the output capacitor in PFC unit 22 and by adjusting the power factor value of unit 22.

Figure 7:
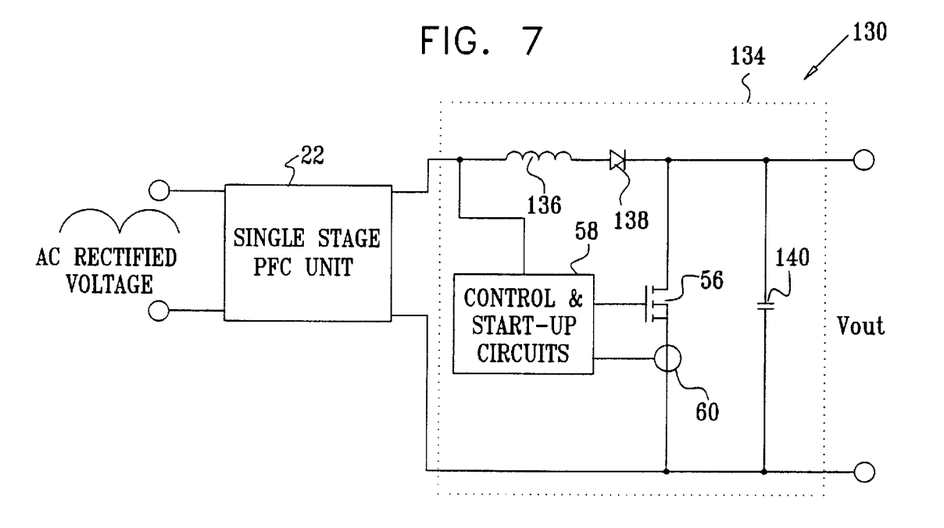

FIG. 7 is an electrical schematic diagram showing a power supply 130, in accordance with another preferred embodiment of the present invention. In this embodiment, a regulator 134 is configured as a boost regulator, in series with PFC unit 22. Regulator 134 applies only a small voltage boost to the PFC unit, however, typically a boost that is equal to or slightly greater than the peak-to-peak ripple in $V_{PFC}$. The output current from PFC unit 22 flows through a boost inductor 136 and a diode 138, and is then pulse-width modulated by switch 56 based on a PWM signal from control circuits 58.

The duty cycle of the PWM signal applied to switch 56 is set so as to cancel the ripple in $V_{PFC}$, thereby creating an output voltage $V_{out}$ on an output capacitor 140 that is substantially free of the ripple. For example, suppose $V_{out}$=50 VDC, and PFC unit 22 is set to give $V_{PFC}$=45 VDC with ripple of 5 V peak-to-peak. Regulator 134 thus receives an input of 45±2.5 V, and is set to boost this input to the 50 VDC output level. In other words, the regulator must generate a waveform varying between 2.5 and 7.5 V. Regulator 134 thus generates, on average, 5 V, which is only 10% of the overall output of power supply 130. The duty cycle, D, that must be applied by switch 56 to generate the required anti-ripple voltage at any point in time is given by:

$$V_{out} - V_{PFC} = V_{PFC} * D/1 - D.$$

In other words, only a small duty cycle (around 10% on average) is needed to give the desired ripple correction.

Although the preferred embodiments described herein are based on particular types of PFC and regulator circuits, the principles of the present invention may be applied, as noted above, using other circuit topologies and other power control modes and algorithms. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Power supply apparatus, comprising:
   a power factor corrector (PFC) unit, which is adapted to receive an AC voltage from an AC source, and to smooth the AC voltage while adjusting a waveform of an AC input current from the AC source relative to the AC voltage so as to generate a PFC voltage made up of a DC component with a residual AC ripple; and
   a regulator, coupled to receive an indication of a ripple amplitude and a ripple phase of the residual AC ripple and to generate, responsive thereto, a correction voltage which is combined with the PFC voltage to generate a DC output voltage in which the AC ripple is substantially reduced relative to the PFC voltage.

2. Apparatus according to claim 1, wherein the PFC unit comprises:
   a switch, which is coupled so that when the switch is closed, the AC input current flows through the switch; and
   a control circuit, which is coupled to open and close the switch so as to adjust the waveform of the AC input current.

3. Apparatus according to claim 2, wherein the control circuit is adapted to control the switch so as to apply a pulse-width modulation (PWM) to the AC input current with a duty cycle selected so as to cause a desired adjustment of the input current waveform.

4. Apparatus according to claim 2, wherein the control circuit is adapted to control the switch so as to apply constant-on-time control to the AC input current.

5. Apparatus according to claim 2, wherein the control circuit is adapted to control the switch so as to apply constant duty cycle/variable frequency control to the AC input current.

6. Apparatus according to claim 2, wherein the control circuit is coupled to receive a feedback input indicative of the PFC voltage, and to open and close the switch responsive to the feedback input.

7. Apparatus according to claim 2, wherein the control circuit is coupled to receive a control input indicative of at least one of the AC voltage and the AC input current, and to open and close the switch responsive to the control input.

8. Apparatus according to claim 1, wherein the PFC unit comprises a transformer comprising primary and secondary windings, which are coupled so that the AC input current flows through the primary winding, while the PFC voltage appears across the secondary winding.

9. Apparatus according to claim 1, wherein the regulator comprises:
   a power input circuit, which is coupled to provide a regulator input current;
   a switch, which is coupled to the power input so that when the switch is closed, the regulator input current flows through the switch; and
   a control circuit, which is coupled to receive the indication of the ripple amplitude and the ripple phase, and to open and close the switch responsive to the indication in order to generate the correction voltage.

10. Apparatus according to claim 9, wherein the PFC unit comprises a first inductor through which the AC input current flows, and wherein the power input circuit comprises a second inductor, which is magnetically coupled to the first inductor so as to generate the regulator input current.

11. Apparatus according to claim 10, wherein the power input circuit further comprises a rectifier, which is coupled to the second inductor so as to rectify the input current for input thereof to the switch.

12. Apparatus according to claim 9, wherein the power input circuit is coupled to receive the AC voltage from the AC source in parallel with the PFC unit.

13. Apparatus according to claim 12, wherein the regulator comprises a transformer comprising primary and secondary windings, which are coupled so that the regulator input current flows through the primary winding, and the correction voltage appears across the secondary winding.

14. Apparatus according to claim 9, wherein the regulator comprises one or more reactive circuit elements, which are coupled together with the switch in a buck-type regulator configuration.

15. Apparatus according to claim 9, wherein the regulator comprises one or more reactive circuit elements, which are coupled together with the switch in a boost-type regulator configuration.

16. Apparatus according to claim 15, wherein the regulator is coupled in series with the PFC unit so that the power input circuit receives the PFC voltage, and wherein the control circuit is operative to open and close the switch with a duty cycle selected so that the output voltage exceeds the PFC voltage by a difference voltage that is approximately equal to a peak-to-peak value of the ripple amplitude.

17. Apparatus according to claim 1, wherein the regulator comprises a linear regulator.

18. Apparatus according to claim 1, wherein the correction voltage has a correction amplitude that is substantially equal to the ripple amplitude and a correction phase that is substantially opposite to the ripple phase, and wherein the correction voltage is added to the PFC voltage in order to generate the output voltage.

19. Apparatus according to claim 1, wherein the PFC unit comprises a PFC output capacitor having first and second terminals, and wherein the regulator comprises a regulator output capacitor having a third and fourth terminals, wherein the third terminal is connected to the second terminal, and wherein the PFC unit is configured to output the PFC voltage across the PFC output capacitor, while the regulator is configured to output the correction voltage across the regulator output capacitor, so that the DC output voltage is provided between the first and the fourth terminals.

20. Apparatus according to claim 1, wherein the correction voltage comprises one of a positive voltage and a negative voltage.

21. Apparatus according to claim 1, wherein the correction voltage comprises both a positive and a negative voltage.

22. Apparatus according to claim 1, wherein the regulator is further adapted to process the DC output voltage so as to generate an AC correction input to the PFC unit.

23. A method for supplying DC power, comprising:
    smoothing an AC voltage received from an AC source while performing power factor correction on a waveform of an AC input current from the AC source relative to the AC voltage, so as to generate a PFC voltage made up of a DC component with a residual AC ripple;

receiving an indication of a ripple amplitude and a ripple phase of the residual AC ripple;

generating, responsive to the indication, a correction voltage; and combining the correction voltage with the PFC voltage to generate a DC output voltage in which the AC ripple is substantially reduced relative to the PFC voltage.

24. A method according to claim 23, wherein performing the power factor correction comprises switching the AC input current so as to adjust the waveform of the AC input current relative to the AC voltage.

25. A method according to claim 24, wherein switching the AC input current comprises applying a pulse-width modulation (PWM) to the AC input current with a duty cycle selected so as to cause a desired adjustment of the input current waveform.

26. A method according to claim 24, wherein switching the AC input current comprises applying constant-on-time control to the AC input current.

27. A method according to claim 24, wherein switching the AC input current comprises applying constant duty cycle/variable frequency control to the AC input current.

28. A method according to claim 24, wherein switching the AC input current comprises receiving a feedback input indicative of the PFC voltage, and opening and closing a switch responsive to the feedback input.

29. A method according to claim 24, wherein switching the AC input current comprises receiving a control input indicative of at least one of the AC voltage and the AC input current, and opening and closing a switch responsive to the control input.

30. A method according to claim 23, wherein performing the power factor correction comprises coupling a transformer comprising primary and secondary windings so that the AC input current flows through the primary winding, thus causing the PFC voltage to appear across the secondary winding.

31. A method according to claim 23, wherein generating the correction voltage comprises switching a regulator input current responsive to the indication in order to generate the correction voltage.

32. A method according to claim 31, wherein the AC input current flows through a first inductor used in performing the power factor correction, and wherein switching the regulator input current comprises receiving the regulator input current from a second inductor, which is magnetically coupled to the first inductor so as to generate the regulator input current.

33. A method according to claim 32, wherein receiving the regulator input current comprises rectifying the current received from the second inductor so as to input the rectified current to the switch.

34. A method according to claim 31, wherein switching the regulator input current comprises receiving the AC input voltage from the AC source so as to generate the regulator input current in parallel with performing the power factor correction.

35. A method according to claim 34, wherein receiving the AC input voltage comprises coupling a transformer comprising primary and secondary windings so that the regulator input current flows through the primary winding, thus causing the correction voltage appears across the secondary winding.

36. A method according to claim 31, wherein generating the correction voltage further comprises coupling one or more reactive circuit elements so that the switched regulator input current flows through the reactive circuit elements in a buck-type regulator configuration.

37. A method according to claim 31, wherein generating the correction voltage further comprises coupling one or more reactive circuit elements so that the switched regulator input current flows through the reactive circuit elements in a boost-type regulator configuration.

38. A method according to claim 37, wherein switching the regulator input current comprises using the PFC voltage as a source of the regulator input current, and switching the regulator input current with a duty cycle selected so that the output voltage exceeds the PFC voltage by a difference voltage that is approximately equal to a peak-to-peak value of the ripple amplitude.

39. A method according to claim 23, generating the correction voltage comprises applying a linear regulator to generate the correction voltage.

40. A method according to claim 23, wherein generating the correction voltage comprises generating a correction voltage waveform having a correction amplitude that is substantially equal to the ripple amplitude and a correction phase that is substantially opposite to the ripple phase, and wherein combining the correction voltage with the PFC voltage comprises adding the correction voltage and the PFC voltage in order to generate the output voltage.

41. A method according to claim 40, wherein smoothing the AC input voltage comprises generating the PFC voltage across a PFC output capacitor having first and second terminals, and wherein generating the correction voltage comprises generating the correction voltage across a regulator output capacitor having a third and fourth terminals, and wherein combining the correction voltage with the PFC voltage comprises connecting the third terminal to the second terminal, so that the DC output voltage is provided between the first and the fourth terminals.

42. A method according to claim 23, wherein generating the correction voltage comprises generating one of a positive voltage and a negative voltage.

43. A method according to claim 23, wherein generating the correction voltage comprises generating both a positive and a negative voltage.

44. A method according to claim 23, and comprising processing the DC output voltage so as to generate an AC correction input to be used in generating the PFC voltage.

* * * * *